United States Patent

Luick

[11] Patent Number: 5,924,117
[45] Date of Patent: Jul. 13, 1999

[54] MULTI-PORTED AND INTERLEAVED CACHE MEMORY SUPPORTING MULTIPLE SIMULTANEOUS ACCESSES THERETO

[75] Inventor: David Arnold Luick, Rochester, Minn.

[73] Assignee: International Business Machines Corporation, Armonk, N.Y.

[21] Appl. No.: 08/767,384

[22] Filed: Dec. 16, 1996

[51] Int. Cl.$^6$ .................................................. G06R 12/00
[52] U.S. Cl. ........................ 711/127; 711/129; 365/230.03
[58] Field of Search ...................................... 711/130, 157, 711/173, 127, 129; 395/311; 365/230.03

[56] References Cited

U.S. PATENT DOCUMENTS

| | | |
|---|---|---|
| 4,363,091 | 12/1982 | Pohlman, III et al. ................. 364/200 |
| 4,633,434 | 12/1986 | Scheuneman . |
| 4,783,736 | 11/1988 | Ziegler et al. . |
| 4,888,679 | 12/1989 | Fossum et al. . |
| 4,888,741 | 12/1989 | Mailinowski . |
| 5,070,444 | 12/1991 | Kubo et al. . |
| 5,179,680 | 1/1993 | Colwell et al. . |
| 5,261,066 | 11/1993 | Jouppi et al. . |
| 5,274,790 | 12/1993 | Suzuki . |
| 5,299,321 | 3/1994 | Iizuka . |
| 5,313,551 | 5/1994 | Labrousse et al. . |
| 5,313,603 | 5/1994 | Takishima . |
| 5,317,718 | 5/1994 | Jouppi . |
| 5,323,489 | 6/1994 | Bird . |
| 5,329,630 | 7/1994 | Baldwin . |
| 5,333,280 | 7/1994 | Ishikawa et al. . |
| 5,333,291 | 7/1994 | Grunbok et al. . |
| 5,355,335 | 10/1994 | Katsuno . |
| 5,404,469 | 4/1995 | Ghung et al. . |
| 5,440,523 | 8/1995 | Joffe . |
| 5,440,713 | 8/1995 | Lin et al. . |

FOREIGN PATENT DOCUMENTS

| | | |
|---|---|---|
| 0213694 | 3/1987 | European Pat. Off. ........ G06F 12/08 |
| 0284751 | 10/1988 | European Pat. Off. . |
| 0345000 | 12/1989 | European Pat. Off. . |
| 0622737 | 11/1994 | European Pat. Off. . |
| 0637799 | 2/1995 | European Pat. Off. ........ G06F 12/08 |
| 0745933 | 12/1996 | European Pat. Off. .......... G06F 9/30 |
| 9177782 | 10/1984 | Japan . |
| 0291740 | 3/1990 | Japan . |
| 0368045 | 3/1991 | Japan . |
| 9313481 | 7/1993 | WIPO . |

OTHER PUBLICATIONS

Sohi, Gurindar S. et al, "High–Bandwidth Data Memory Systems for Superscalar Processors", Computer Architecture News, No. 2, Apr. 1991, pp. 53–62.

Primary Examiner—John W. Cabeca
Assistant Examiner—David Langjahr
Attorney, Agent, or Firm—Michael K. Mutter; Thomas S. Auchterlonie; Birch, Stewart, Kolasch, and Birch

[57] ABSTRACT

A high speed pseudo-, 8-, 16-, or greater, ported cache memory, and associated effective address generation scheme. Based upon either two-port building blocks, or twice as many single-port building blocks, which are interleaved, the cache memory is arranged as a functional equivalent to a true 8-, 16-, or greater ported interleaved cache memory.

25 Claims, 10 Drawing Sheets

5,924,117

MULTI-PORTED AND INTERLEAVED CACHE MEMORY SUPPORTING MULTIPLE SIMULTANEOUS ACCESSES THERETO

TECHNICAL FIELD OF THE INVENTION

The present invention is directed toward a cache memory that can accommodate multiple, i.e., at least two simultaneous memory accesses, e.g., load operations out to a computer. More particularly, the present invention is directed to a multi-ported and interleaved cache memory. Moreover, the multi-ported and interleaved cache memory is especially suited to a very long instruction word ("VLIW") computer capable of making multiple simultaneous memory accesses in one cycle.

BACKGROUND OF THE INVENTION

Highly parallel computer architectures, such as N-way superscalar, VLIW, and DATAFLOW processors perform many load operations and/or storage operations simultaneously with every cycle and so require cache memories with very high bandwidth. Considering the VLIW architecture as exemplary, it exploits fine-grained parallelism in order to perform many load operations and/or storage operations simultaneously per cycle.

Traditional parallelism in computing systems involves multiple processors. The processors are connected by a communications network and are controlled so that more than one processor is active at the same time. To use a traditional parallel processor on a particular application, a programmer or a sophisticated compiler must break the problem into pieces, and set up appropriate communications and controls. In general, this approach is most easily applied to problems which divide naturally into large pieces which have little need to communicate with each other. Many applications, however, cannot be structured this way. As such, traditional parallel processing has not be very effective except for "scientific" numerical methods and other highly structured problems.

Fine-grained parallelism is an extension of instruction-level parallelism in several respects. A compiler discovers machine instructions within a program which may be executed at the same time. These separate instructions are put together into a compound instruction, the "very long instruction word" (VLIW). Each part of a VLIW instruction controls a separate part of the hardware in the computer, such as an arithmetic logic unit ("ALU"), a path to main storage, or a path to a register. In one VLIW machine cycle, these separate resources within a VLIW computer can all be used independently, so several basic machine instructions can be executed simultaneously. This confers the advantage that a task can be completed in fewer machine cycles than is possible on a traditional unit processor uniprocessor.

The VLIW technique improves performance on a uniprocessor. As such, it can be viewed as exploiting intra-computer parallelism, which is another term for fine-grained parallelism. In contrast, traditional, or coarse-grained, parallelism can be viewed as inter-computer parallelism. Of course, it is possible to exploit intra-computer and inter-computer parallelism by connecting several VLIW computers as one operating unit.

FIG. 1 is a block diagram depiction of a prior art VLIW architecture, including the associated memory hierarchy. A register file 110 is connected to the functional units 102–108. More particularly, each of the load/storage unit 102, the floating point addition unit 104, the integer ALU 106, and the branch unit 108 have two load lines delivering data from the register file 110 and one storage line for storing data from the functional units to the register file 110. The register file 110 is referred to as the L0 memory level.

FIG. 1 also includes the L1 memory level, or cache, 112, which is bi-directionally connected to the register file 110 and the L2 memory level 114. The L2 memory level 114 is bi-directionally connected to the L3 memory level 116. The L3 memory level 116 is also bi-directionally connected to the L4 memory level 118. The general principles of the memory hierarchy depicted in FIG. 1 are well known.

Historically, two factors have affected the speed at which a computer operates, the first factor is the speed at which the processor, e.g., its slowest functional unit, can operate upon data that is presently available. The second factor is the speed at which data needed by a functional unit can be obtained. Historically, it has been more difficult to improve the second factor rather than the first factor.

The VLIW concept recognizes that, for a given memory access time, you can improve your effective operating speed if you process more pieces of data at the same time. For example, eight functional units will operate upon sixteen pieces of data in one cycle. In contrast, a computer that can only use one of its functional units in any one cycle will require eight cycles to operate upon sixteen pieces of data, given a rate of two data pieces per cycle. In the example, the VLIW computer is eight times faster than the traditional computer despite having the same memory access time.

Yet the VLIW computer can only achieve the improvement if there is a cache that can supply sixteen pieces of data at the same time to the eight functional units, respectively. A true eight-, or more, ported cache array has been thought to be impractical from the perspectives of wireability, performance, power density, and noise tolerance at high speeds, e.g., less than one nanosecond access time. A true eight-, or more, ported cache array is extremely complex. It has substantial performance problems, because e.g., N ports tend to place heavy loads upon the current sourcing ability and capacitance of the cell output device. In terms of laying out the circuitry, any one output port must be able to drive any one of the pipes/busses.

In contrast, forming the cache into separately-functioning parts, or modules, i.e., interleaving, requires that each interleaf drive only one pipe line. By spreading out the cache via interleaving, the wireability improves, thereby improving performance. Each cell can be built smaller because only one or two output ports need to be driven.

It is an object of the present invention to provide a cache memory that can accommodate multiple simultaneous memory accesses, e.g., load operations to a VLIW computer.

It is an object of the present invention to provide a device that functions equivalently to a true 8-ported-and-interleaved cache memory but one that is not truly 8-ported, i.e., a pseudo-8-ported and interleaved cache memory that can accommodate 8 simultaneous memory accesses.

It is an object of the present invention to provide a pseudo-, 16-, or greater, ported and interleaved cache memory that can accommodate 16, or more, simultaneous memory accesses.

It is an object of the present invention to provide a method and apparatus for generating effective addresses at which to store data in an 8-, 16-, or greater, ported and interleaved cache memory.

It is an object of the present invention to provide a method of compiling a program to optimize use of an 8-, 16-, or greater, ported and interleaved cache memory.

SUMMARY OF THE INVENTION

The present invention provides a cache memory that can accommodate multiple simultaneous memory accesses, e.g. multiple load operations requested by a VLIW computer.

The present invention provides a cache memory that can accommodate multiple simultaneous memory accesses without suffering the costs, in terms of wireability, performance, power density, and noise tolerance, of a true multi-ported cache memory because a pseudo-multi-ported cache memory is formed of logical building blocks. Consequently, the pseudo-multi-ported cache memory has the functional capabilities, but not the technological and/or manufacturing complexities, of a true multi-ported cache memory..

The problems of a true-multi-ported memory, e.g., wireability and power density are solved, i.e., the present invention provides a pseudo-, 8-, 16-, or greater, ported and interleaved memory, formed from logical building blocks, which does not suffer such problems. In one embodiment, the logical building block has a single write port, a single read port, and a dedicated row address bus. In the second embodiment, the logical block has a first set of one write port and one read port operatively connected to a dedicated read address bus and a second set of a write port and a read port operatively connected to another dedicated read address bus.

The objects of the present invention are also fulfilled by providing a pseudo-multi-ported and interleaved cache memory storing a plurality of data units. This memory is partitioned into a first logical part and a second logical part. Each logical part stores a plurality of data units. Each logical part is interleaved into M banks, M≧2. Each bank includes: at least a first write/control port; and at least a first read port. Each bank has one dedicated row address bus per pair of a write port and a read port. The first write/control port of each logical part is operatively connected to a first write/control bus and the second write/control port of each logical part is operatively connected to a second write/control bus such that a write operation on the first write/control bus is independent of a write operation on the second write/control bus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Because a physical, or true, 8-, or greater, ported high speed cache array is currently impractical, the embodiments of the present invention implement a building block approach in which multiples of a practical physical building block, preferably the largest one, are used to logically form a pseudo-, 8-, 16-, or greater, ported and interleaved cache memory.

Figure 1:
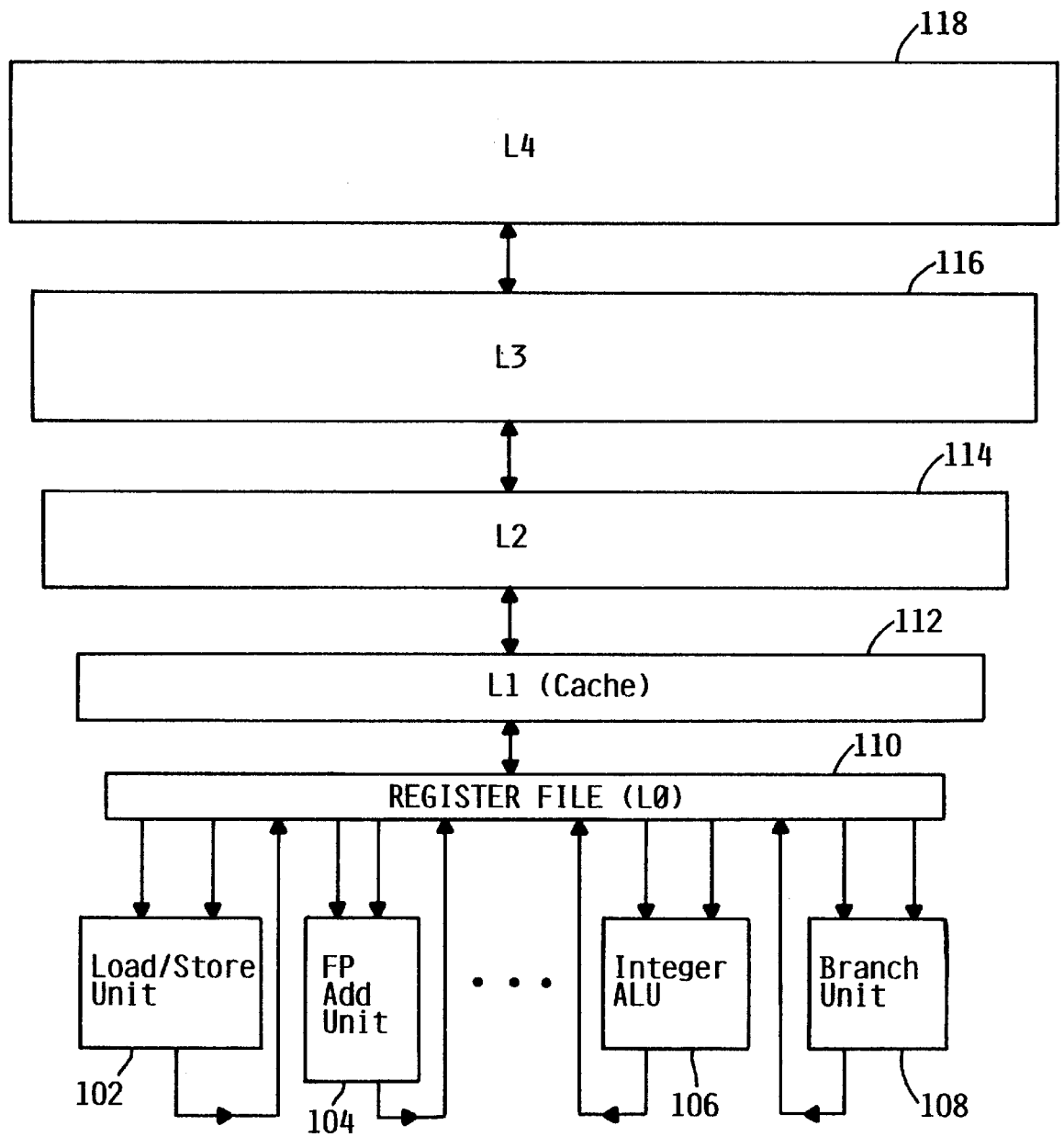
FIG. 1 is a block diagram of a prior art very long instruction word (VLIW) computer and its associated memory hierarchy.
Figure 2A:
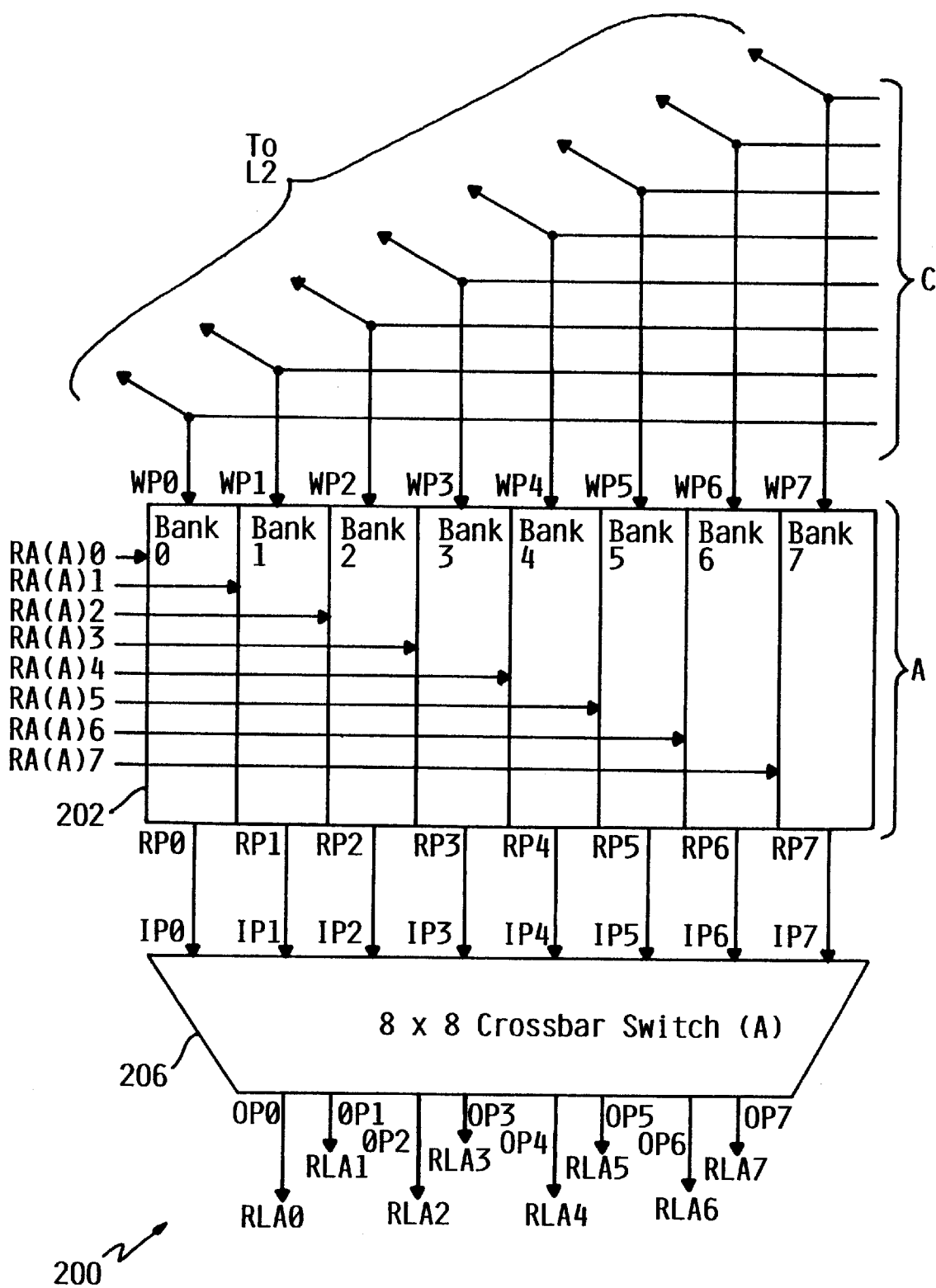
FIG. 2 is a block diagram of the first, and preferred, embodiment of the cache memory of the present invention.
Figure 2B:
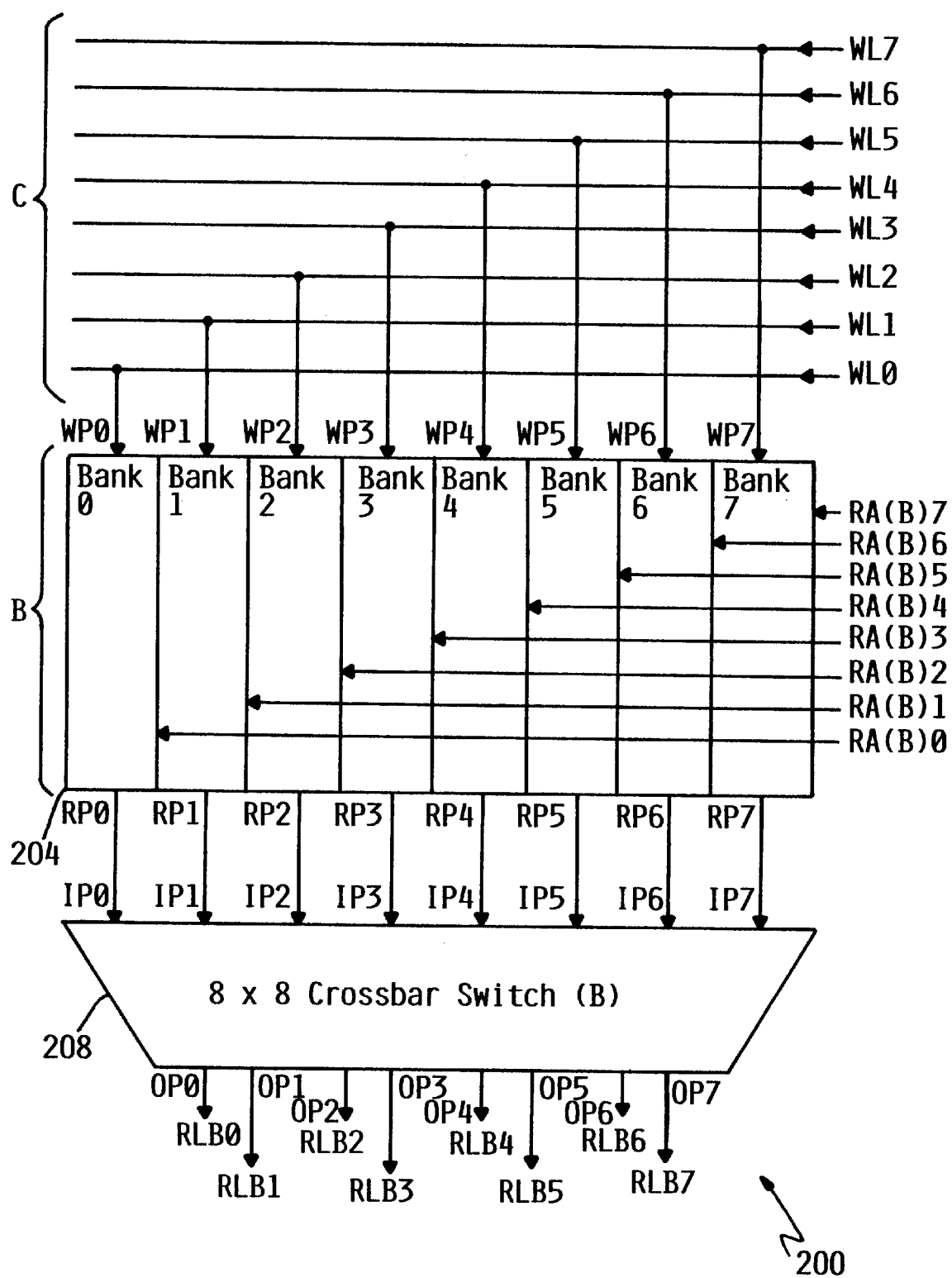

FIG. 2 depicts a block diagram of the first, and preferred, cache memory embodiment of the present invention. The cache memory 200 of FIG. 2 is preferably a pure data cache, but can be a mixed instruction/data cache, and is intended to replace the L1 cache 112 of FIG. 1. The L1 cache memory 200 includes: a first logical part A, also identified as item 202; a second logical part B, also identified as item 204; an 8X8 crossbar switch-A 206; and an 8X8 crossbar switch-B 208.

Each of the logical parts 202 and 204 are divided, e.g., into eight banks or building blocks, identified as bank0 to bank7. Each bank$_j$ includes a write port WP$_j$ and a read port RP$_j$. The write port WP$_j$ is connected to a write line WL$_j$ that is eight bytes wide.

Each of the crossbar switches 206 and 208 has eight input ports, IP0 to IP7 and eight output ports, OP0 to OP7. Each of the output ports of the crossbar switch 202 is connected to a read line, RLA0 to RLA7, respectively. Similarly, each of the output ports of the crossbar switch 208 is connected to a read line, RLB0 to RLB7, respectively. Each of the address lines RLA0 to RLA7 and RLB0 to RLB7 are connected to the register file 110 of FIG. 1.

The input ports of the crossbar switch 206 are connected to the read ports of the logical part 202. Similarly, the input ports of the crossbar switch 208 are connected to the read ports of the logical part 204.

Each of the write lines WL0 to WL7, the buses connecting a read port of a logical part to a crossbar switch input port, and the read lines RLA0 to RLA7 and RLB0 to RLB7 are, e.g., eight bytes wide, where eight bytes of data represents a double word.

Figure 3:
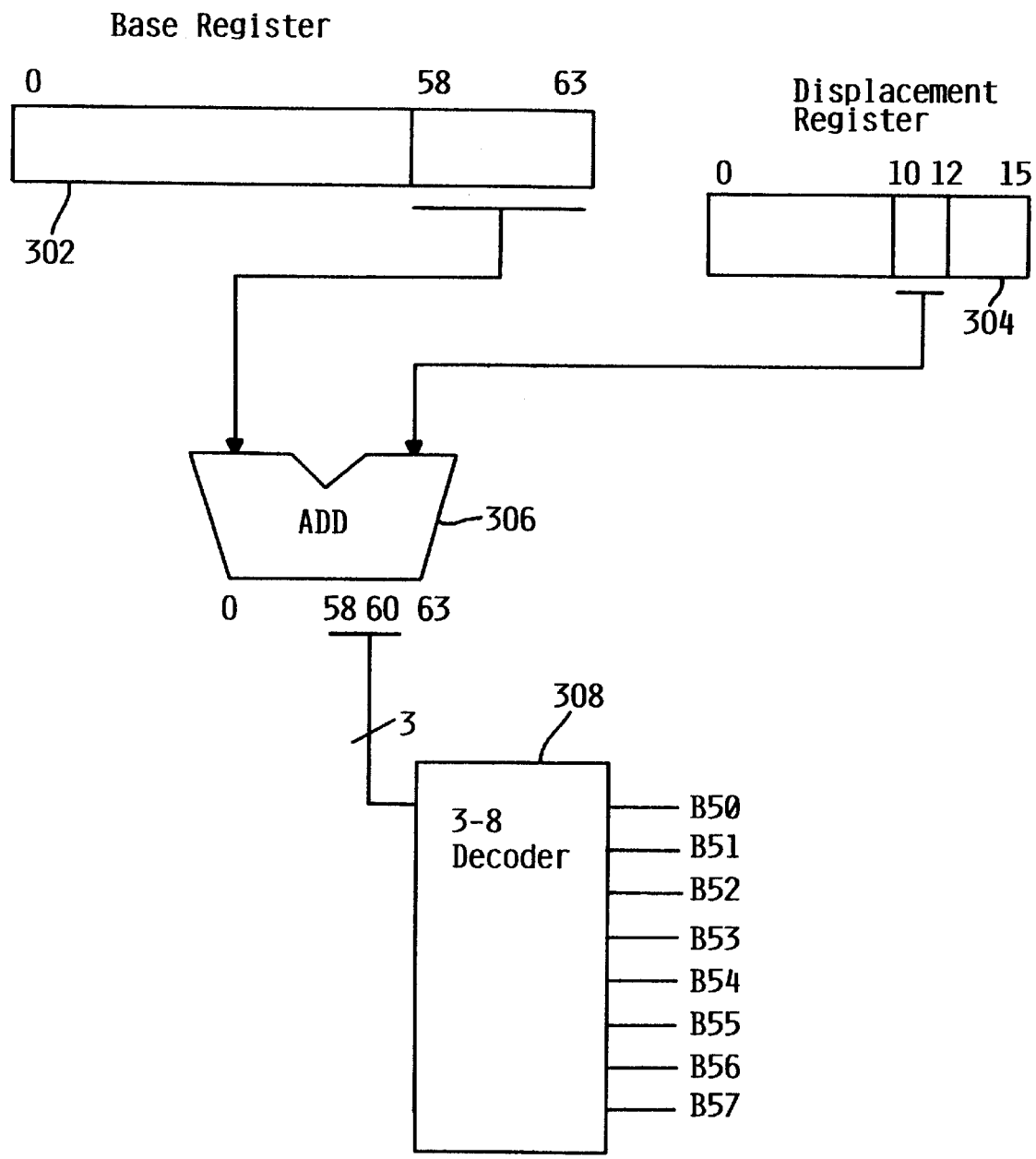
FIG. 3 is a block diagram of the hardware involved in the addressing scheme used in connection with the cache memory of the present invention.

FIG. 3 depicts a block diagram of the preferred structure than embodies the method for generating an effective address at which to store data in the 8-, 16-, or greater, ported and interleaved cache memory of the present invention. A base register 302 is connected to one input of an adder 306. A displacement field of the instruction register 304 is connected to the other input of the adder 306. The output of the adder 306 is connected to a 3–8 decoder 308. The output lines of the decoder 308 are used as bank select lines, BS 0 to BS 7.

Figure 4A:
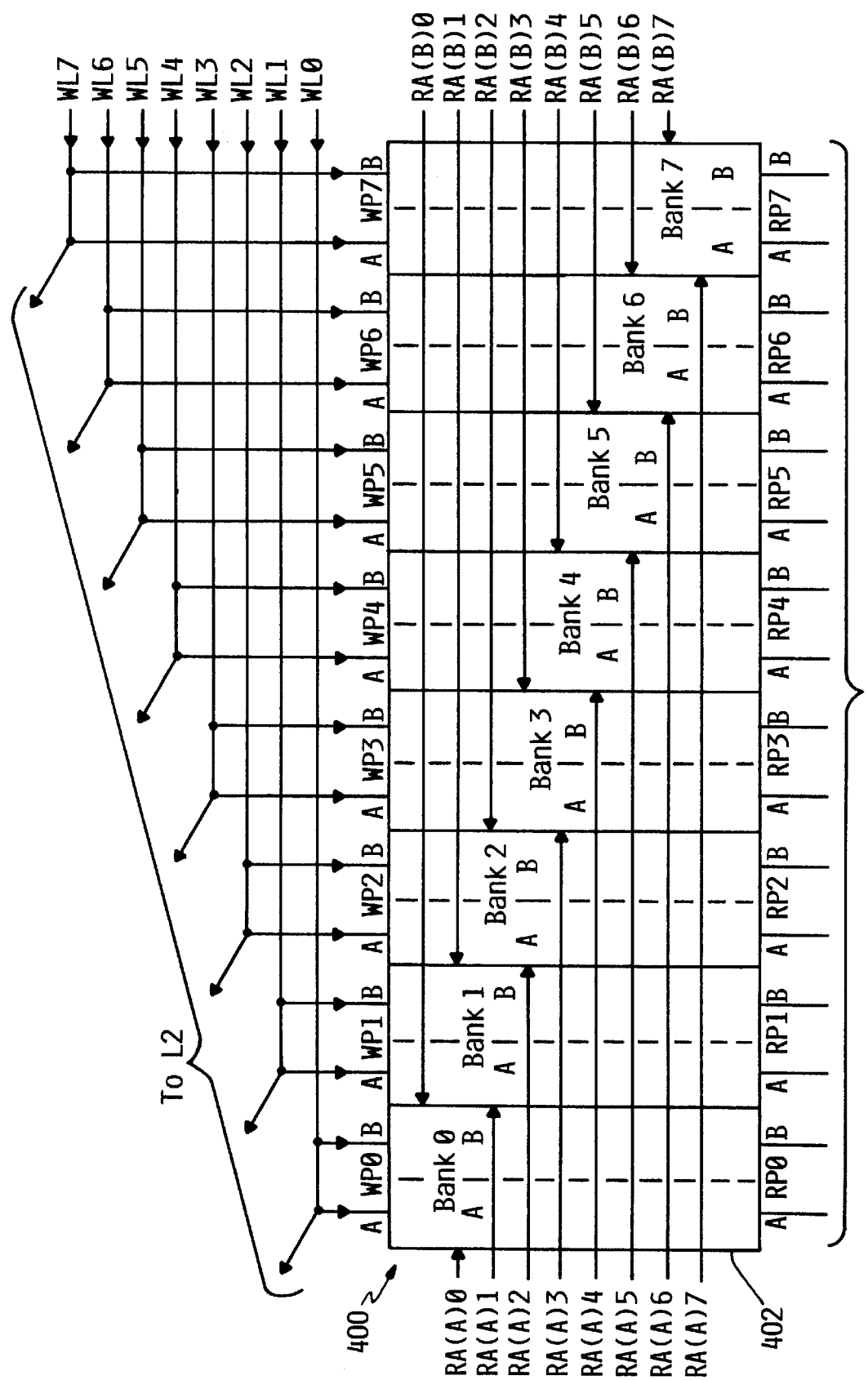
FIG. 4 a diagram of a second embodiment of the cache memory of the present invention.
Figure 4B:
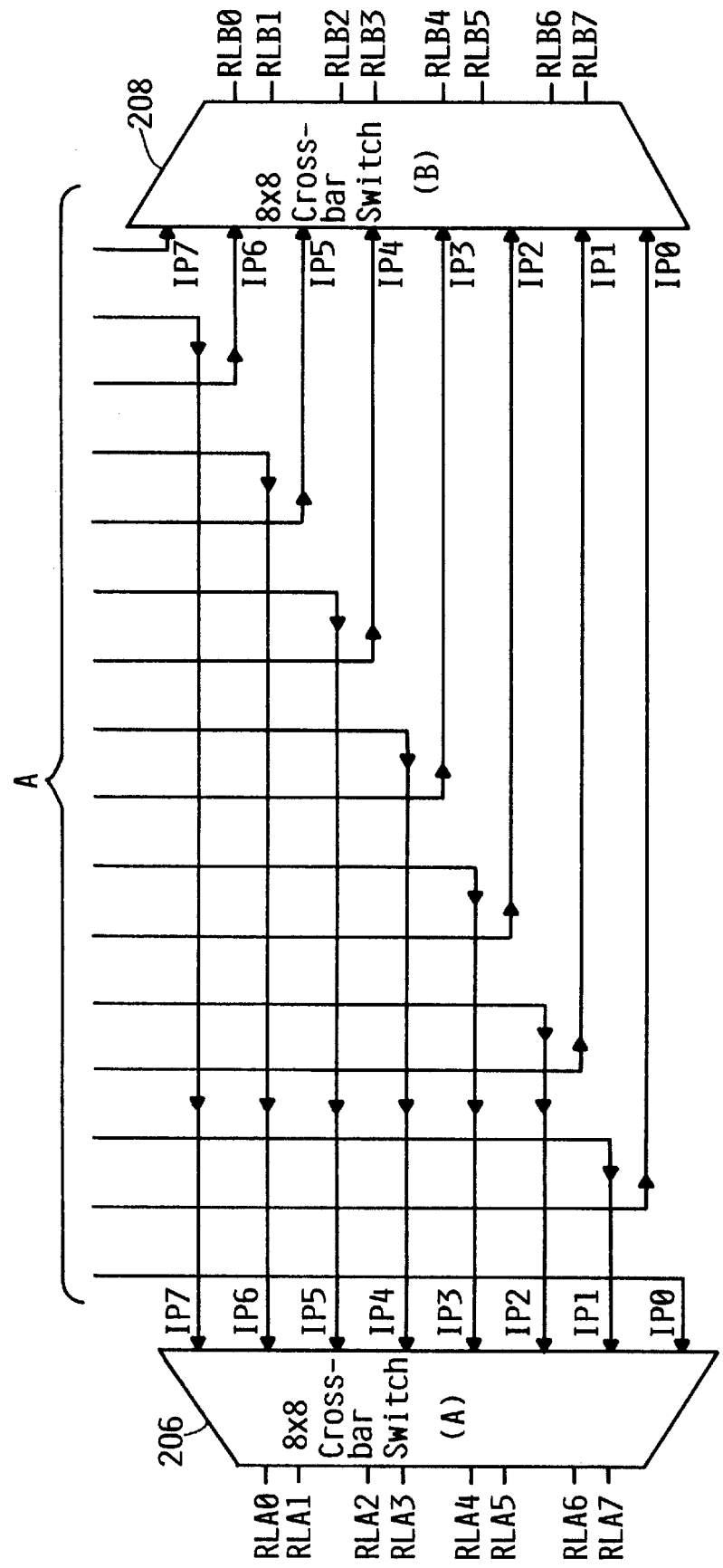

FIG. 4 depicts the second embodiment of the cache memory of the present invention, and is an alternative to the preferred embodiment of FIG. 2. A storage device 400 is shown as having eight banks, bank0 to bank7. Each of the banks is a 2-ported logical building block having two logical parts, A and B. Port A of bank$_j$ has a write port A-WP$_j$ and a read port A-RP$_j$, and has a dedicated read address bus RA(A)$_j$. Similarly, port B of bank$_j$ has a write port B-WP$_j$ and a read port B-RP$_j$, as well as a dedicated read address bus RA(B)$_j$. Each of the write ports A-WP$_j$ and B-WP$_j$ are connected together to a write line WL$_j$. In other words, for each of the banks0–7 there is a write line WL0 to WL7, respectively.

As in FIG. 2, there is an 8X8 crossbar switch 206 and an 8X8 crossbar switch 208, the inputs of the crossbar switch 206 being connected to the read ports of the logical part A of the storage structure 400 and the input ports of the crossbar switch 208 being connected to the read ports of the logical part B.

Also, as in FIG. 2, the write lines WL0 to WL7, the read lines RLA0 to RLA7 and RLB0 to RLB7, as well as the lines connecting the read ports of the storage structure 400 to the input ports of the crossbar switches 206 and 208 are all eight bytes wide.

Figure 5:
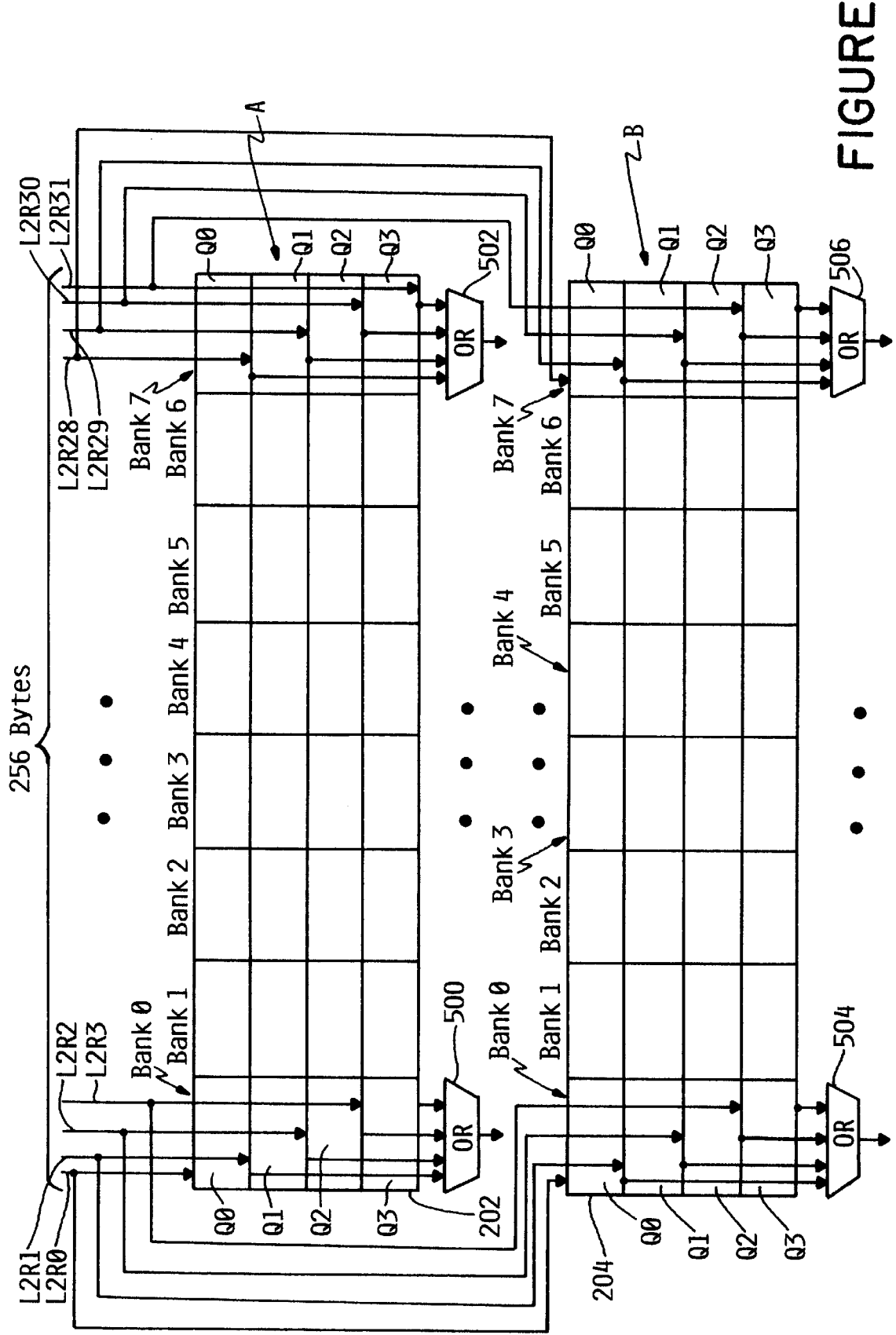
FIG. 5 is a block diagram of optional additional aspects of the first embodiment.

FIG. 5 shows a block diagram of optional additional aspects of the first embodiment shown in FIG. 2. As in FIG. 2, there are two storage devices 200 and 204, each having banks0–7. Each bank is additionally divided into four quadrants, Q0 to Q3. Each of the quadrants is connected to an eight-byte-wide data line from the L2 memory level 114 of FIG. 1. For example, in bank0, quadrant Q0 is connected to L2 reload line L2R0, Q1 is connected to L2R1, Q2 is connected to L2R2, and Q3 is connected to L2R3. Similarly, for example, in bank7, Q0 is connected to L2 reload line L2R28, Q1 is connected to L2R29, Q2 is connected to L2R30, and Q3 is connected to L2R31.

Consistent with FIG. 2, in which the write lines for corresponding ports of logical part A and B are connected together, the L2 reload lines of FIG. 4 are connected together such that, for example, in bank0 of data structure 204, Q0 is also connected to L2RO, Q1 is also connected to L2R1, Q2 is also connected to L2R2, and Q3 is also connected to L2R3. The connections between the L2 reload lines and the other banks/quadrants have been omitted to preserve simplicity in FIG. 5.

The four quadrants in each bank are also each connected to an OR gate, for example, OR gate 500 is connected to quadrants 0–3 of bank0 of the storage structure 200. The OR gate 502 is connected to each of the quadrants Q0–Q3 of bank7 of the storage structure 200. The OR gate 504 is connected to each of the quadrants Q0–Q3 of bank0 of data structure 204 while the OR gate 506 is connected to each of quadrants Q0–Q3 of bank7. Each of the OR gates 500 are connected to the register file 110 of FIG. 1. Similar to the L2 reload lines, each line connecting a quadrant to an OR gate is eight bytes wide. The L2 reload lines 0–31 replace the connection between the L2 memory level 114 of FIG. 1 and the write lines WL0 to WL7 of FIG. 2. Again, not all of the OR-gates in FIG. 5 have been depicted in order to preserve the simplicity of FIG. 5.

Figure 6:
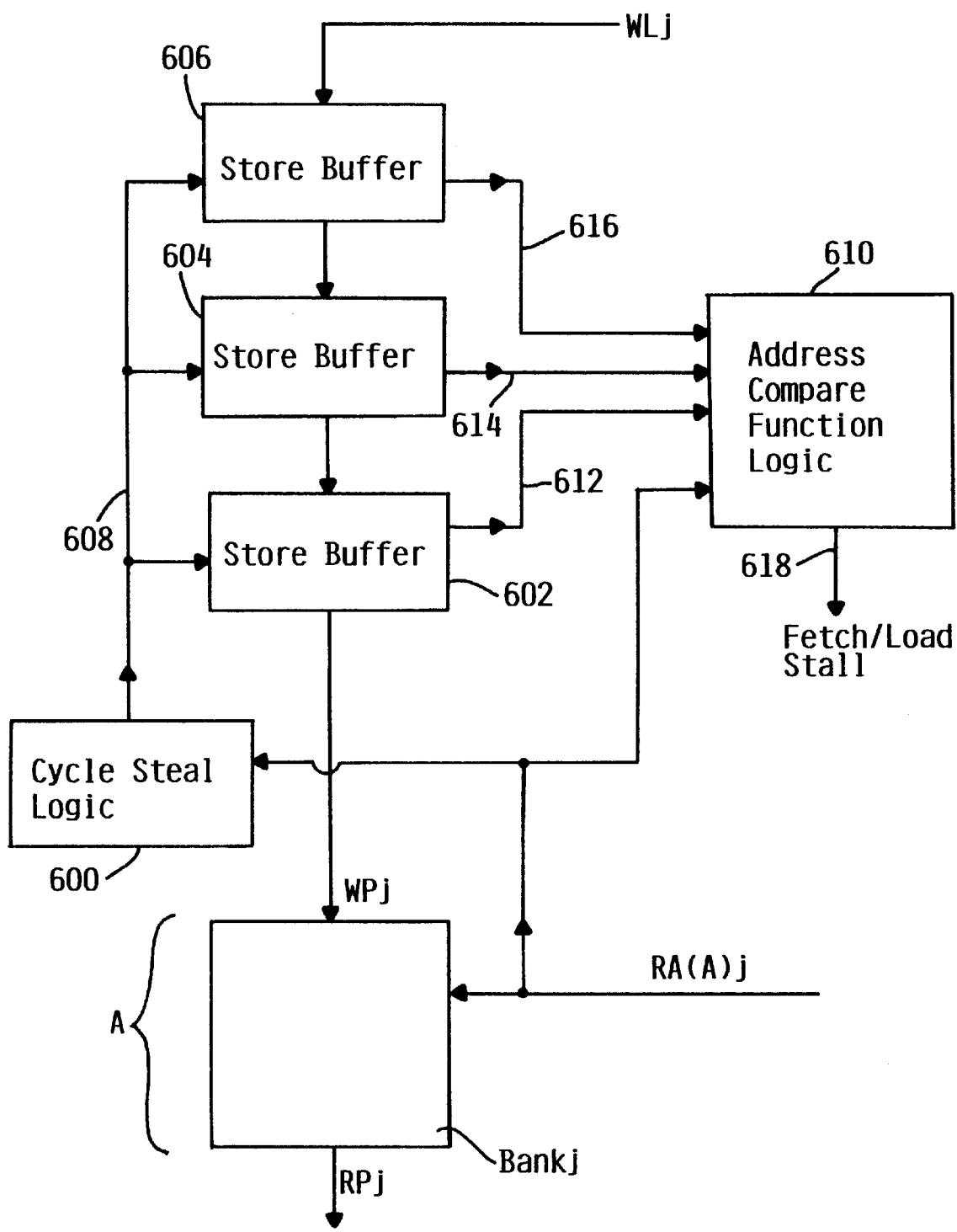
FIG. 6 is a block diagram of optional additional, and preferred, buffering aspects of the first embodiment.

FIG. 6 depicts a block diagram of the structures involved in optional additional, and preferred, buffering aspects of the first embodiment. In FIG. 6, only a portion of one of the logical parts, namely bank$_j$ of part A, has been shown, to preserve the simplicity of the diagram. Cycle steal logic 600, discussed more fully below, receives the address signals on the read address line RA(A)$_j$.

Three storage instruction ("store-op") buffers are shown as being serially connected to the bank$_j$, i.e., the write line W$_j$ is shown as feeding the store-op buffer 606. The store-op buffer 606 feeds the store-op buffer 604. The store-op buffer 604 feeds the store-op buffer 602, and the store-op buffer 602 feeds the write port WP$_j$ of the bank$_j$.

The cycle steal logic 600 sends control signals to each of the store-op buffers 602, 604, and 606 via the signal line 608. Also, there is shown address compare function logic 610 which receives the read address signals on the read address line RA(A)$_j$ as well as the addresses of the locations targeted by the buffered storage instructions, from each of the store-op buffers 602–606 via the signal lines 612–616, respectively. The address compare function logic 610, which will be described more fully below, outputs a fetch/load stall-control signal via the signal line 618.

Figure 7:
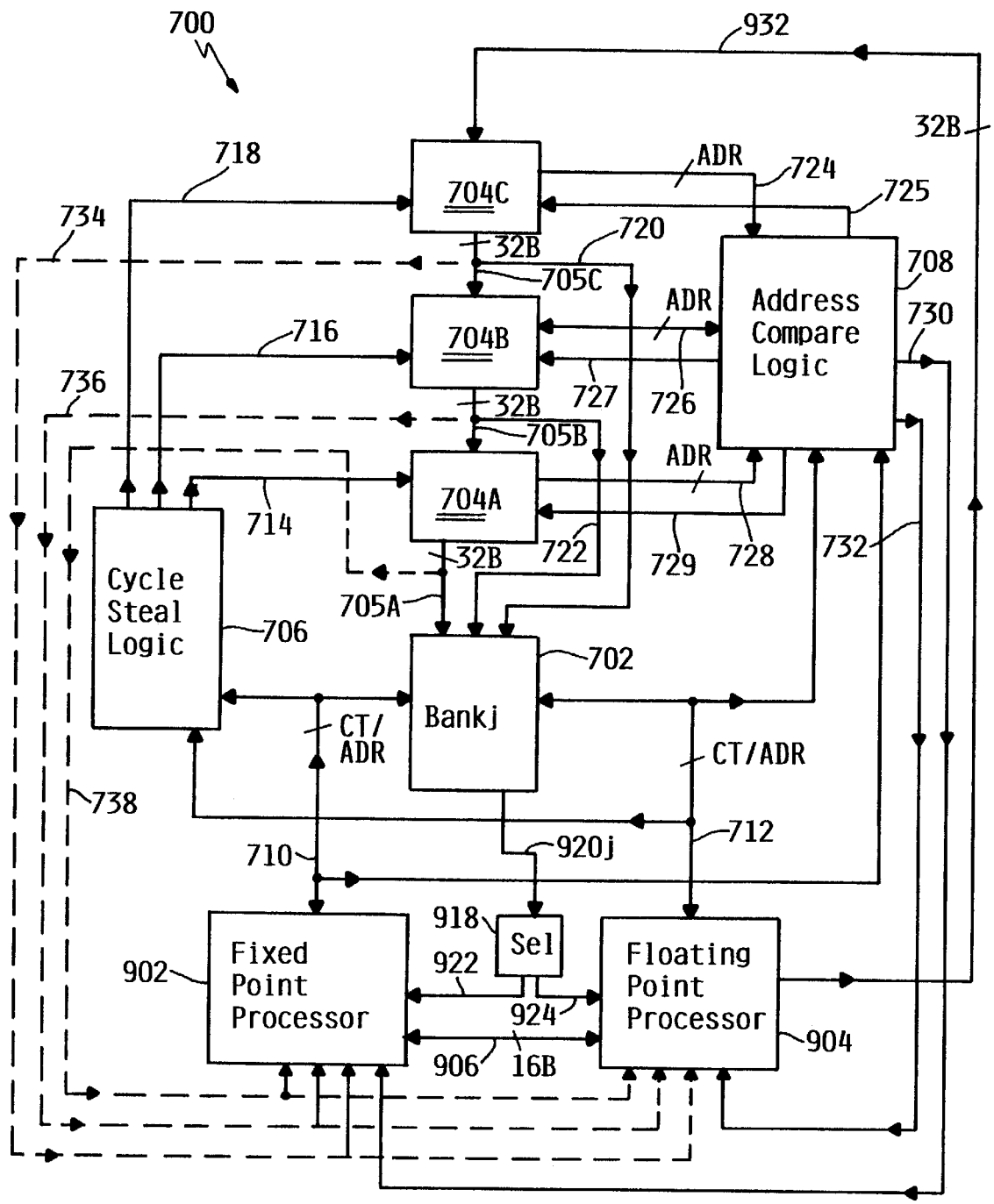
FIG. 7 is a more detailed block diagram of the buffering aspects of FIG. 6.

FIG. 7 is a more detailed block diagram of the buffering aspects of the cache memory of the present invention. FIG. 7 shows an exemplary bank 702 of the cache memory 200 or 400, referred to as "bank$_j$". Similarly, the three exemplary store-op buffers associated with the bank$_j$, i.e., item 702, are items 704$_A$, 704$_B$, and 704$_C$.

In FIG. 7, a fixed point processor 902 is connected to a floating point processor 904 by a bi-directional 16 byte register-to-register data bus 906. The floating point processor 904 is connected to the store-op buffer 704$_C$ by a 32 byte wide write bus 932.

The bank$_j$ of FIG. 7 can store a plurality of 8 byte double-words. Further, it has a read port connecting the bank$_j$ to the fixed point processor 902 and the floating point processor 904 via a line 920$_j$, a selector 918 and lines 922 and 924, respectively. The selector 918 can be, e.g., one of the crossbar switches 206 and 208 of FIGS. 2 or 4, respectively.

The floating point processor 904 of FIG. 7 is connected to the store-op buffer 704$_C$ via a 32 byte wide write address bus 932. The store-op buffer 704$_C$ is connected to the store-op buffer 704$_B$ by the 32 byte wide bus 705$_C$. The store-op buffer 704$_B$ is connected to the store-op buffer 704$_A$ by the 32 byte wide bus 705$_B$. The store-op buffer 704$_A$ is connected to the bank$_j$ 702 by the 32 byte wide bus 705$_A$.

The store-op buffer 704$_C$ of FIG. 7 is also directly connected to the bank$_j$ 702 by the buffer-bypass bus 720. Similarly, the store-op buffer 704$_B$ is also directly connected to the bank$_j$ 702 by the buffer-bypass bus 722.

FIG. 7 also includes cycle steal logic 706, which is connected to the fixed point processor 902 by the bi-directional bus 710 and to the floating point processor 904 by the bi-directional bus 712. The cycle steal logic 706 also sends control signals to each of the store-op buffers 704$_A$, 704$_B$, and 704$_C$ by the signal lines 714, 716, and 718, respectively.

FIG. 7 also includes address compare logic 708, which receives address signals from the following: the fixed point processor 902 via the bus 710; the floating point processor 904 via the bus 712; the store-op buffer 704$_A$ via the signal lines 728; the store-op buffer 704$_B$ via the signal lines 726; and the store-op buffer 704$_C$ via the signal lines 724. The address compare logic 708 sends control signals to the store-op buffers 704$_A$, 704$_B$, and 704$_C$, over the signal lines 725, 727, and 729, respectively. The address compare logic 708 also sends control signals to the fixed point processor 902 via the signal lines 730 and to the floating point processor 904 via the signal lines 732.

As an alternative to the buffer-bypass buses 720 and 722, FIG. 7 shows the bank-bypass buses 734, 736, and 738 (as dashed lines). The bank-bypass bus 734 connects the store-op buffer 704$_C$ directly to the fixed point processor 902 and also the floating processor 904. The bank-bypass bus 736 directly connects the store-op buffer 704$_B$ to both the fixed point processor 902 and the floating point processor 904. Similarly, the bank-bypass bus 738 directly connects the store-op buffer 704$_A$ to the processors 902 and 904.

Figure 8:
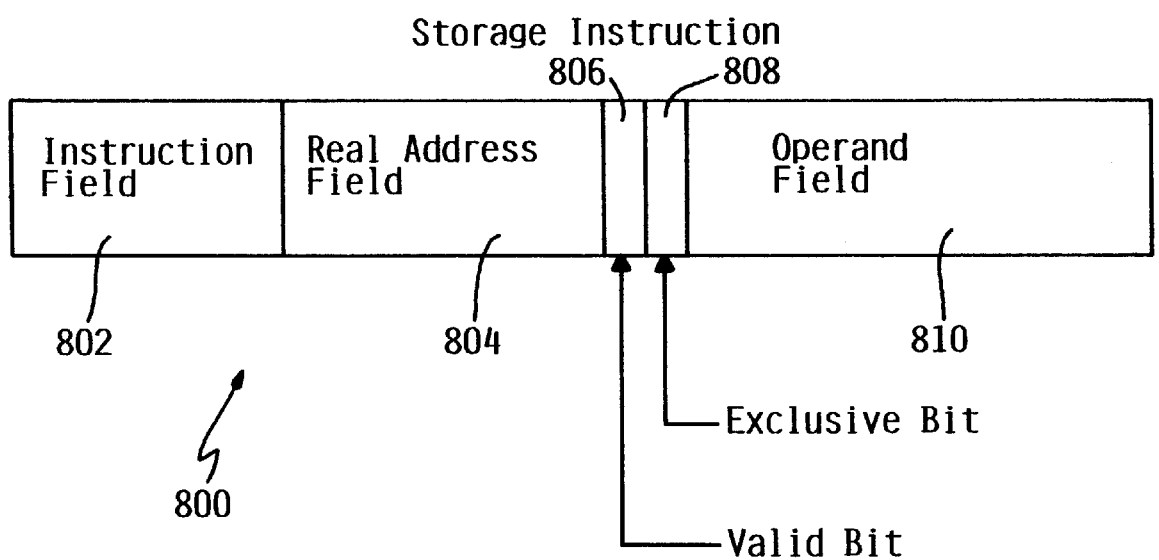
FIG. 8 depicts the organization of a storage instruction to be issued by a processor using the buffering aspects of the cache memory of the present invention.

FIG. 8 depicts the fields of a storage instruction 800 that is issued by either of the processor 902 and 904. The storage instruction 800 includes: an instruction field 802; a real address field 804; a valid bit 806; an exclusive bit 808; and an operand field 810.

THE OPERATION OF THE PREFERRED EMBODIMENTS

The operation of the preferred embodiment of FIG. 2 will now be described. Because the write port of each bank in the logical part A, i.e., the storage device 202, is connected to the write port in the corresponding bank of the logical part B, i.e., the storage device 204, respectively, the cache memory 200 of FIG. 2 can perform eight simultaneous eight-byte storage operations. In contrast, the cache memory 200 has sixteen independent read ports, namely read ports RP0 to RP7 of the logical part A (item 202) and the read ports RP0 to RP7 of the logical part B (item 204) so that it can perform 16 simultaneous 8-byte read operations.

The crossbar switch for logical part A, i.e., item 206, enables any of the write ports RP0 to be connected to any of the write lines RLA0 to RLA7. For example, it is possible to connect the write port RP0 of item 202 to the read line RLA2 of item 206, and the read port RP1 to the read line RLA7. The remaining read ports RP2 to RP7 can be similarly connected in an arbitrary fashion to the remaining read lines RLA0 to RLA1 and RLA3 to RLA6. Such arbitrary cross connections can all take place within one memory access cycle.

The cache memory 200 is divided or interleaved into the two logical parts A and B. The compiler transforms the program written by the user into a program to be executed by the parallel processor, such as a VLIW computer, by exploiting fine-grained parallelism. The compiler is relied upon to limit the number of simultaneous random loads, i.e., non-sequential and non-related loads, to the same bank as no more than two. By providing two logical parts, the problem of two loads in one cycle to the same bank is resolved because one of the load operations can take place in bank$_j$ of logical part A and one can take place in bank$_j$ of logical part B. For example, even-numbered parcels of the VLIW are allowed to load from the first logical port while odd-numbered parcels load from the second logical port.

The present invention recognizes that relying upon the compiler to limit the number of same-cycle loads to the same bank restricts the type of addressing that can be used. FIG. 3 depicts an embodiment that reflects such recognition. Most superscalar processors support at least two types of addressing: (1) X-type or X-form addressing; and (2) base-plus-displacement-type, or D-form, addressing. In X-type addressing, the address is formed by adding the contents of two registers. Yet this is problematic for a compiler.

A compiler cannot determine the contents of a register because this is an unknown variable at compile time. In contrast, with base-plus-displacement-type addressing, the displacement is known because it is included as an operand within the instruction in the program that is being parallelized by the compiler. Still, the contents of the base register are technically an undetermined variable.

The present invention, an address generator of which is depicted in FIG. 3, also reflects the recognition that the contents of the base register have a very high probability of having a 0 value for certain bits, e.g., 58–63, of the base register. For example, for commercial reduced instruction set computing code, the majority of the most commonly referenced objects, i.e., chunks of memory, are highly aligned, usually along 32-byte or larger boundaries. A highly aligned object starts on a definite boundary such as the beginning of a cache page or cache line. The compiler can enhance the situation by forcing the register to be aligned by adding a given value to the address in the base register, for which subsequent compensation takes the form of subtracting the given value from subsequent values in the displacement register.

The address generator of FIG. 3 generates displacement-type, or D-form, addresses based upon the assumption that bits 58–63 of the base register will be zero. This makes it possible for the compiler to limit to no more than two the number of same cycle random loads to the same bank. Without having to deal with more than two random loads per cycle per bank, the cycle memory can be formed from only two logical parts and yet be functionally equivalent to a multi-ported memory.

By limiting the processor associated with the cache memory of the present invention to using only base-plus-displacement-type addressing, and by recognizing that the bits 58–63 of the base register will almost always be 0, the compiler can determine the address of any storage instruction to the cache memory with a very high degree of certainty at compile time. In other words, the bits 10–12 of the displacement register become a very accurate predictor of the bank within the cache memory that will be the subject of a storage instruction.

The adder 306 of FIG. 3 operates upon bits 58–63 of the base register 302, which have a very high probability of always being 0, and upon bits 10–12 of the displacement register 304. For effective address generation purposes, only bits 58–60 of the 64-bit sum produced by the adder 306 are needed. As such, the 3–8 decoder of FIG. 3 operates only upon bits 58–60 of the sum output by the adder 306. The eight output lines of the decoder 308 are used as the bank select lines BS0 to BS7.

The relative advantages of the single-ported building block, e.g., FIG. 2, versus the dual-ported building block, e.g., FIG. 4, are as follows. For small cache arrays, it is natural to implement one data write line going into the cell and one data read line going out of the cell because the cell has separate read and write nodes. A single-port cell requires extra switching circuitry to connect the data bus to either the read node or the write node. At the array level, however, one wire going in and one wire coming out of a cell consumes only slightly more space than the single wire and its associated switching circuitry, but the two wires are slightly faster because it is unnecessary to change configurations when switching between reading and writing.

As discussed above, the use of eight banks is exemplary. For example, either four banks or sixteen banks, or more, could be used. If sixteen banks were used, than the adder 306 would operate upon four rather than three bits from the displacement register 304. Similarly, the decoder 308 would be a 3–16 decoder operating upon four rather than three bits selected from the sum of the adder 306.

As is well known in memory hierarchy technology, the L2 memory level 114 of FIG. 1 can write an entire line, also referred to as a block, of the L1 cache memory simultaneously within one memory access. This ability is reflected in the write ports WP0 to WP7 of each of the logical parts A and B of the cache memory 200 being connected to the L2 memory level 114 of FIG. 1.

The operation of the second embodiment of the cache memory, of FIG. 4, will now be discussed. The logical parts A and B are combined into one storage device 402 formed of a set of two-port building blocks or banks. The interleaved banks0–7 have a logical part A and a logical part B, each of which has a read port and a write port, a dedicated read address bus, and a dedicated write address bus connected thereto, respectively. The operation is very similar to the embodiment of FIG. 2 except that accessing corresponding parts of logical part A and logical part results in accessing the same physical building block, rather than two separate building blocks as in FIG. 2.

The operation of the additional optional aspects of the first embodiment, as depicted in FIG. 5, will now be described; these additional aspects are equally applicable to the second embodiment. The L2 reload lines, L2R0-L2R31, connected to each of the quadrants in each of the banks enables the L2 memory level 114 of FIG. 1 to reload the entire cache memory, i.e., both of the storage devices 202 and 204 simultaneously in one memory access time period. This greatly enhances the bandwidth between the L1 cache and the L2 memory level. To restate, the L2 memory level 114 can deliver 256 bytes at the same time to the L1 cache memory 200.

The OR gate 500, associated with each bank$_j$, is used instead of a four-way selector connected to each of the quadrants Q0 to Q3. Because only one sub-level or quadrant is read at a given time, it is only necessary to combine the outputs of the quadrant with the OR gate. This has the benefit of being faster than the four-way switch that would otherwise be used.

The operation of the optional additional aspects of the embodiment, depicted in FIG. 6, will now be described; these additional aspects are equally applicable to the embodiment depicted in FIG. 4.

For sixteen or more interleaves, storage instruction buffering must be done in order to achieve practical results. Also, for operating systems that require storage instructions to be executed in the same order as stated by the original program, storage instruction buffering is very important.

There are instances in which there are eight load operations being performed upon either, or both, of the logical parts, e.g., A & B of FIGS. 2 or 4, of the cache memory of the present invention within one memory access cycle. In such circumstances, a conflict occurs if one or more storage instructions have also been scheduled for that cycle. The conflicting storage instructions are held in abeyance in the buffers.

Load operations are given priority over storage operations. Generally, load instructions will outnumber storage instructions by a ratio of 2:1. The optional additional aspects of FIG. 6 enables the cache memory, e.g., the embodiment 200 of FIG. 2, to be able to buffer the storage instructions until a cycle in which the bank to which a storage instruction is targeted will not be accessed via a load operation.

Each of the store-op buffers 602, 604, and 606 of FIG. 6 hold a storage instruction, which includes an identification of the location within the bank to which the storage operation is directed, and the associated data to be stored.

The cycle steal logic 600 of FIG. 6 determines when one or more banks will not be accessed by a load operation in the next cycle. Comparators (not shown) in the cycle steal logic 600 determine, e.g., from the three bank-interleave bits of the read address on the read address line RA(A)$_j$, whether there will be a load operation on the bank during the next cycle. If no load operation is to be performed in the next cycle, then the cycle steal logic 600 enables the contents of the store-op buffer to be released to the bank so that the storage instruction can take place in the next cycle. At the same time, the cycle steal logic 600 also sends control signals to the store-op buffers 604 and 606 so that the contents, if any, of the store-op buffers 604 and 606 are transferred to the store-op buffers 602 and 604, respectively, in preparation for the subsequent execution cycle.

Three store-op buffers have been disclosed, e.g., FIG. 6, as being sufficient for the number of storage instructions that can accumulate on a routine basis. The number of store-op buffers can be increased or decreased according to the particular application, or eliminated entirely as depicted in FIGS. 2 and 4.

A set of one cycle steal logic 600 and three buffers 602, 604, and 606 is provided for each of the banks in the cache memory of the present invention.

FIG. 6 also shows address compare function logic 610. When storage instructions are buffered, there arises the possibility that a load instruction might attempt to access data that has yet to be written into the bank of the cache memory because it has been buffered in one of the store-op buffers. To detect such a situation, comparators (not shown) in the address compare function logic 610 compare the full target address in all of the store-op buffers for all of the banks against the address being targeted by each load operation in each cycle. If a store-op buffer is currently empty, the address comparison for that store-op buffer is not enabled by the logic 610, to prevent spurious results.

If a match exists, i.e., if an address targeted by a load instruction is the same as an address targeted by a storage instruction in one of the buffers, then the address compare function logic 610 stalls execution of the load operation until the corresponding storage operation has been drained from the store-op buffer queue. The output of all the comparisons is combined, e.g., with an OR gate (not shown), to produce the raw stall signal. In other words, the load operation is stalled or prevented from being executed until enough execution cycles have elapsed so that the matching storage instruction has been transferred out of the buffers and performed upon the bank.

The buffering operation will be discussed in more detail with reference to FIG. 7. Again, FIG. 7 depicts an exemplary bank, bank$_j$ 702 and associated exemplary store-op buffers 704$_A$–704$_C$, that could correspond, e.g., to any one of the banks bank$_0$–bank$_7$ of either of logical parts A or B, 202 or 204 of FIG. 2, respectively. The changes needed to apply the exemplary embodiment of FIG. 7 to the exemplary embodiment of FIG. 4 are within the ordinary level of skill in the art.

A storage instruction, e.g., as depicted in FIG. 8, issued by either the fixed point processor 902 or the floating point processor 904 of FIG. 7, is transferred over the write bus 932 to the third store-op buffer 704$_C$. If no storage instruction is being held in the second store-op buffer 704$_B$, the storage instruction in the buffer 704$_C$ is transferred to the buffer 704$_B$. Similarly, if no storage instruction is being held in the first store-op buffer 704$_A$, the storage instruction is transferred from the second buffer 704$_B$ to the first buffer 704$_A$.

The cycle steal logic 706 of FIG. 7 monitors the load/fetch instructions issued by the processors 902 and 904. Comparators (not shown) in the cycle steal logic 706 determine, e.g., from the two bank-interleave bits of the read address on the lines 710 and 712, whether there will be a load operation on the bank 702 during the next cycle. If, in the next machine cycle, the bank$_j$ 702 will not be accessed by either of the processors 902 and 904, then the cycle steal logic sends control signals to the first buffer 704$_A$ over the communication lines 714 so that the storage instruction held in the buffer 704$_A$ can be completed by a write operation in the bank$_j$ 702 during the next instruction cycle. The output of the comparators is combined, e.g., by an OR gate (not shown), to form a raw signal which makes up part of the control signals sent to the buffers. Included in the control signals from the cycle steal logic 706 is a bank-write clock enable signal output during a given cycle for a given storage instruction address.

The cycle steal logic 706 also sends control signals to the buffers 704$_B$ and 704$_C$ so that any storage instruction that each might hold gets transferred down to the next storage buffer, i.e., a storage instruction in the buffer 704$_C$ gets transferred to the buffer 704$_B$, and a storage instruction in the buffer 704$_B$ gets transferred to the buffer 704$_A$.

The preferred embodiments reflect an assumption that no more than three storage instructions are likely to accumulate at any given time, thus only three store-op buffers have been shown. The appropriate number of storage instruction buffers will vary according to the particular application, and such variation is within the ordinary level skill in the art. If, for example, the processor is a floating point processor, then large bursts of storage activity and large bursts of load activity can be expected; the number of store-op buffers should be increased accordingly.

A normal pipe stall, e.g., a cache miss can cause a 5 or 10 cycle delay. This is another opportunity for the store-op buffers to be drained into the cache banks under the control of a cache controller (not shown).

The preferred organization of the level Li cache memory 200 or 400 and the processors 902 and 904 reflects an assumption that only one address generator is needed for each of the processors 902 and 904 such that each processor can only perform a data load/fetch from one bank at a time. The number of data load address generators varies according to the particular application and such variation is within the ordinary level of skill in the art.

Usually, not only is the intrabank order of storage instructions preserved, but inter-bank storage instruction order as well. Having an exclusive cache line makes it possible to disregard inter-bank order. An exclusive bit in the cache address is used by the cache directory (not shown). If set, then this indicates that the processor associated with this cache is the only processor that has this cache line. Usually storage instructions are completed in the order set by the program because of there being other copies of the cache line. Having an exclusive cache line permits storage instructions to this cache to be drained in any order. For example, if the three store-op buffers were full already and still another storage instruction was sent out, the most recent storage instruction could be controlled to bypass those already in the store-op buffers.

Besides storage operations to exclusive cache lines, the compiler and cache hardware also recognize that storage instructions to known non-shared storage devices (i.e., stacks, heaps, etc.) can also be performed out of order. An extra op-code bit is necessary in this situation.

A circumstance can occur in which one of the processors 902 and 904 can issue a load/fetch instruction which targets a location in the bank$_j$ 702 that previously was supposed to have data written into it by a storage instruction, but that storage instruction is being held in one of the store-op buffers 704$_A$–704$_C$. Comparators (not shown) in the address compare logic 708 compare the address for each load/fetch instruction against the full targeted address in the storage instructions in the buffers 704$_A$–704$_C$.

If a match occurs, i.e., if the location targeted by the load/fetch instruction is the same as a location targeted by a buffered storage instruction, then the address compare logic 708 will stall the execution of load/fetch instruction by the processor until the storage instruction to the bank$_j$ 702 can be completed. The output of the comparators in the address compare logic 708 is combined, e.g., by an OR gate (not shown), to produce this raw stall signal. If a store-op buffer is currently empty, the address comparison for that store-op buffer is not enabled by the logic 708, to prevent spurious results. To reiterate, the address compare logic 708 makes such comparisons for, and controls, all the store-op buffers.

There are three ways in which the address compare logic 708 can cause storage instructions to be drained/percolated out of the buffers 704$_A$–704$_C$.

The preferred method of draining/percolating, i.e., buffer bypass, is a compromise between speed and wireability. If the storage instruction that matches the load instruction is found within buffer 704$_C$, for example, then the address compare logic 708 causes the storage instruction to be transferred directly to the bank$_j$ 702 via the buffer-bypass bus 720 rather than indirectly through the buffers 704$_B$ and, in turn, 704$_A$. Similarly, if the matching storage instruction is found in the buffer 704$_B$, the address compare 708 causes the storage instruction to be transferred directly to the bank$_j$ 702 via the buffer-bypass bus 722 rather than indirectly through the buffer 704$_A$.

As an alternative to this buffer bypass approach, the address compare logic 708 simply causes all of the storage instructions ahead of the matching storage instruction to be executed, i.e., stored by the bank$_j$ 702. This approach, however, will cause the load operation to be stalled an additional amount equal to the time necessary to execute the storage instructions in the buffers 704$_A$ and 704$_B$, relative to the circumstance in which the matching storage instruction is found in the buffer 704$_C$ and the storage instructions in the buffers 704$_A$ and 704$_B$ are bypassed. A faster alternative to the buffer bypass, albeit a more difficult technique to implement because of wireability considerations, can be referred to as the bank bypass technique. This is the technique indicated by the dashed bank-bypass buses 734, 736, and 738 depicted in FIG. 3, which are intended to be used in place of the buffer-bypass buses 720 and 722, although the bank-bypass buses and the buffer-bypass buses are not necessarily mutually exclusive, i.e., they could be used together. If the matching storage instruction is found in the third buffer 704$_C$, for example, then the address compare logic instructs the processor that issued the load instruction to load the data directly from the buffer 704$_B$ or 704$_A$ via the bank-bypass bus 736 or 738, respectively.

When the address compare logic 708 compares the addresses of storage instructions in the buffers 704$_A$–704$_C$ against the load instruction(s), it recognizes the presence of a storage instruction in a buffer by whether or not the valid bit 806 of FIG. 8 is set to a logical one or not. When a storage instruction is transferred from, e.g., the buffer 704$_C$ to the buffer 704$_B$, the valid bit location 806 in the buffer 704$_C$ is reset to a logical zero to indicate that no storage instruction is being held.

Another alternative embodiment allows for the possibility of snooping by another processor. Snooping occurs when a processor looks at another processor's data cache ("Dcache") directory. The snooping processor might be looking for data that has yet to be updated by a buffered storage instruction. Either another set of address compare logic could be added to identify the situation in which the snooped-for data is being buffered, or more simply the buffers can be drained automatically upon snooping. The latter approach is preferred because the frequency of snooping and the resulting buffer drain probably does not outweigh the costs of the additional set of address compare logic.

As should be apparent from the discussion of the operation of FIG. 7, storage instructions in different banks will be executed asynchronously relative to the order in which they were issued, according to the frequency of instances in which the banks are not accessed by a load/fetch instruction. Similarly, the buffer bypass technique and the bank bypass technique enable storage instructions for a particular bank to be executed asynchronously to the order in which they were issued.

If a cache miss occurs, and if there is at least one store-op buffer for one of the banks, then the address compare logic will stall a cache reload, to be performed by the remainder of the memory system, e.g., the L2 level, until all of the storage instructions have been drained out of the store-op buffers. Such draining will involve executing each storage instruction in turn until all the storage instructions have been drained. At most, this will require three cycles because storage instructions from different banks can be done in parallel within the same cycle.

The cache memory can perform the conventionally known functions of cache memories, e.g., it has the capacity to use a dirty bit to indicate to the L2 memory level that there is changed data so that a write-back operation can take place prior to a line/block reload of the L1 cache by the L2 memory level.

Again, the cache memory of the present invention can be either a pure data cache or a combined instruction/data cache. If it is a combined instruction/data cache, than the processor will load instructions from it, i.e., perform I-fetches. Such a fetch can be variable in length, e.g., loading from one bank or all 8 banks. Thus, an I-fetch will be treated by the cache memory as just another load or multiple loads. Opportunities to steal a cycle will be monitored, storage instructions will be buffered, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-ported and interleaved cache memory storing a plurality of data units, the memory comprising:
   a memory partitioned into a first logical part and a second logical part,
      each logical part storing a plurality of the data units, each logical part being interleaved into M banks, $M \geq 2$;
         each bank including
            at least a first write/control port, and
            at least a first read port;
         each bank having one dedicated row address bus per pair of a write port and a read port; and
         each bank being accessible by at least two cache-access requestors; and
   M bank write buses, each pair of a write port in a bank of the first logical part and a write port in a corresponding bank of the second logical part being connected to one of the M bank write buses such that write ports in corresponding banks are written to simultaneously;
   each read port being independent of the others.

2. The multi-ported memory as in claim 1, wherein:
   each bank has a second write port and a second read port forming a second pair;
   the first logical part corresponds to the first write ports and first read ports of the banks and the second logical part corresponds to the second write ports and second read ports of the banks such that the first logical part shares banks with the second logical part; and
   each bank has one dedicated row address bus associated with the first write port and the first read port pair and one dedicated row address bus associated with the second write port and the second read port pair;
   each bank representing a two-ported logical building block.

3. The multi-ported memory as in claim 2, further comprising:
   a plurality of bank-read buses in a ratio of one bank-read bus per read port such that each bank has a first and second bank-read bus; and
   an N-way cross-bar switch, operatively connected to the bank-read buses and having N, N–2, output ports where N equals the number of bank-read data busses.

4. The multi-ported memory as in claim 2, wherein the multi-ported memory has 16 ports and M=8 such that each logical part has 8 write ports and 8 read ports.

5. The multi-ported memory as in claim 2, wherein the multi-ported memory has 8 ports and M=4 such that each logical part has 4 write ports and 4 read ports.

6. The multi-ported memory as in claim 1, wherein a data unit is 8 bytes in size and data unit represents a double word.

7. The multi-ported memory as in claim 1, wherein each bank has only one write port, only one read port, and only one dedicated row address bus such that each bank represents a single-ported logical building block and the first and second logical parts do not share any of the banks.

8. The multi-ported memory as in claim 7, wherein the multi-ported memory has 16 ports and M=8 such that each logical part has 8 write ports and 8 read ports.

9. The multi-ported memory as in claim 7, wherein the multi-ported memory has 8 ports and M=4 such that each logical part has 4 write ports and 4 read ports.

10. The multi-ported memory as in claim 7, further comprising:
    a plurality of bank-read buses in a ratio of one bank-read bus per bank;
    a first N-way cross-bar switch operatively connected to each bank-read bus of the first logical part, the first N-way cross-bar switch having N output ports where N equals the number of bank-read data buses for the first logical part; and
    a second N-way cross-bar switch operatively connected to each bank-read bus of the second logical part, the second N-way cross-bar switch having N output ports where N equals the number of bank-read data buses for the second logical part.

11. The multi-ported memory as in claim 7, wherein the multi-ported memory holds 64K bytes.

12. The multi-ported memory as in claim 1, wherein the multi-ported memory has an access time of less than 1 nanosecond.

13. The multi-ported memory as in claim 1, wherein:
    the first write/control bus and the second write/control bus are each operatively connected to a next slower level of memory;

the first write/control bus and the second write/control bus are each sufficient in size such that the next slower level of memory can simultaneously reload an entire row of the cache memory.

14. The multi-ported memory as in claim 13, wherein:

each bank is divided into four quadrants, each quadrant being equivalent in size to the data unit; and the multi-ported memory further includes, for each bank:

a dedicated quadrant-write bus from the next slower level of memory for each quadrant sufficient in size such that the next slower level of memory can reload the entire multi-ported memory simultaneously.

15. The multi-ported memory as in claim 14, wherein the multi-ported memory further includes, for each bank:

an bank-out put bus equivalent in size to the data unit; and a 4:1 switch for selectively connecting one of the four quadrant-buses to the bank-output bus.

16. The multi-ported cache memory as in claim 1, wherein the multi-ported memory further includes, for each logical part of each bank:

at least a first store-op buffer, operatively connected to the write port and the first write/control bus, storing a first storage instruction to the bank; and a next cycle use determination circuit for determining occurrence of a first condition that a load operation will be performed on the bank in the next cycle;

a cycle steal circuit for enabling, if the condition occurs, the storage instruction in the first store-op buffer to be performed upon the bank in the next cycle.

17. The multi-ported cache memory as in claim 16, further comprising:

an address compare circuit for determining occurrence of a second condition that a location addressed by a storage instruction in a buffer of any of the banks is the same as an address for a load instruction to be performed on the multi-ported cached memory in the next cycle;

a match stall circuit for stalling, if the second condition occurs, the matching load instruction until the matching storage instruction can be performed upon the corresponding bank.

18. The multi-ported cache memory as in claim 16, further comprising:

a second store-op buffer, operatively connected between the first store-op buffer and the first write/control bus, storing a second storage instruction to the bank;

a third store-op buffer, operatively connected between the second store-op buffer and the first write/control bus, storing a third storage instruction to the bank;

wherein the cycle steal circuit also generates percolation signals that control the second and third store-op buffers to transfer the contents thereof to the first and second store-op buffers, respectively.

19. The multi-ported cache memory as in claim 1, wherein the multi-ported cache memory is a pure data cache.

20. An effective address generating device for generating an effective address at which to retrieve data from a multi-ported cache memory using base-plus-displacement-type addressing, the cache memory being interleaved into M banks, $M \geq 2$, and storing a plurality of data units, the effective address generating device comprising:

a displacement register;

a presupposing circuit for presupposing that predetermined bits of a base register will be a logical zero; and a U:V decoder receiving a predetermined set of U bits of the displacement register, $U \geq 2$, and outputting a V-bit number, having a sufficient number of bits to identify one of the M banks, as the effective address of the data in the interleaved multi-ported cache memory.

21. A method of generating an effective address at which to retrieve data from a multi-ported, cache memory using base-plus-displacement-type addressing, the cache memory being interleaved into M banks, $M \geq 2$, and storing a plurality of data units, the method comprising:

presupposing that predetermined bits of a base register will be a logical zero;

reading the contents of a displacement register;

decoding identification information, based upon a predetermined set of U bits of the displacement register, $U \geq 2$, of one of the M banks; and outputting the identification information as the effective address of the data in the interleaved multi-ported cache memory.

22. The method of claim 21, further comprising:

verifying that the contents of the base register are zero.

23. A method of compiling a program to optimize use of a multi-ported cache memory, the cache memory being interleaved into a plurality of banks and storing a plurality of data units, the method comprising:

permitting only base-plus-displacement-type addressing of the cache memory;

determining, for a base register, a condition of whether one or more of a predetermined group of bits of the base register does not equal a logical zero value; and realigning, if the condition is satisfied, and the contents of the base register and correspondingly adjusting the contents of a displacement register.

24. The multi-ported memory as in claim 1, wherein each bank is accessible by all possible cache-access requesters.

25. The device of claim 20, wherein the presupposing circuit includes:

an adder to add said predetermined bits of said base requester and said predetermined set of U-bits from said displacement register to produce a sum, a predetermined group of bits of said sum being provided to said U:V decoder.

* * * * *